Feb. 20, 1934.　　　　　A. MAZZA　　　　1,947,998
PIPE COUPLING

Filed Sept. 12, 1928

Inventor
Adolfo Mazza
By Knight Bro
attys

Patented Feb. 20, 1934

1,947,998

UNITED STATES PATENT OFFICE 1,947,998

PIPE COUPLING

Adolfo Mazza, Genoa, Italy, assignor to Johns-Manville Corporation, New York, N. Y., a corporation of New York Application September 12, 1928, Serial No. 305,564, and in Italy November 19, 1927

5 Claims. (Cl. 285—114)

The present invention has for its subject matter a pipe coupling for all those applications where it is required that the coupling, whether elastic or not elastic, shall remain tight even under high pressures.

The novel coupling comprises a sleeve and two discrete india rubber rings.

The construction and erection accordingly are extremely simple. The sleeve may be made of any suitable material: cast iron, forged iron, Eternit (cement and asbestos), armored concrete, stoneware, wood, etc. and may be carried out in various ways.

The invention is illustrated by the drawing showing longitudinal sections in which.

Figure 1:
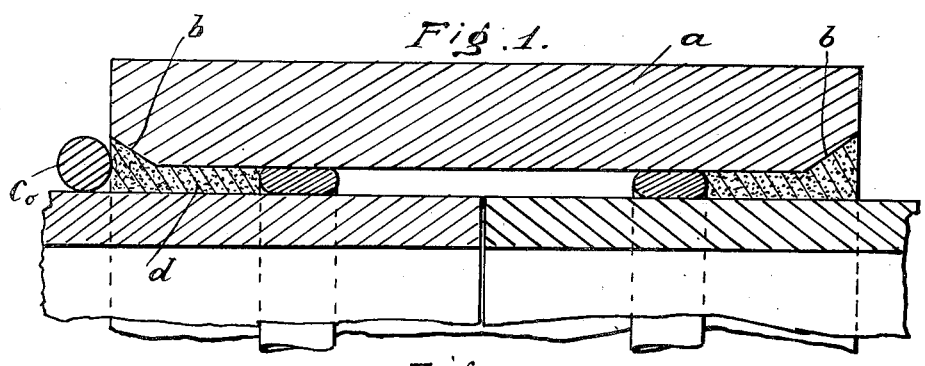
Fig. 1 shows the more simple construction intended for low pressures.

In the construction according to Fig. 1 the sleeve $a$ has a uniform bore and a bellmouthing $b$ at each end in order to permit the introduction of the india rubber rings $c$; the sleeve thickness varies according to the internal pressure due to the fluid to be conveyed plus the stress due to the expanding force of the compressed rubber used as packing. Further, the sleeve bore must be such as to leave free an annular interstice between the outer surface of the pipe and the inner surface of the sleeve, the said annular interstice being equal to about half diameter of the section of the rubber packing rings. After the coupling has been assembled these packings reduce the diameter of their own section to about a half, in order that through their compression they may secure a perfect tightness.

Figure 2:
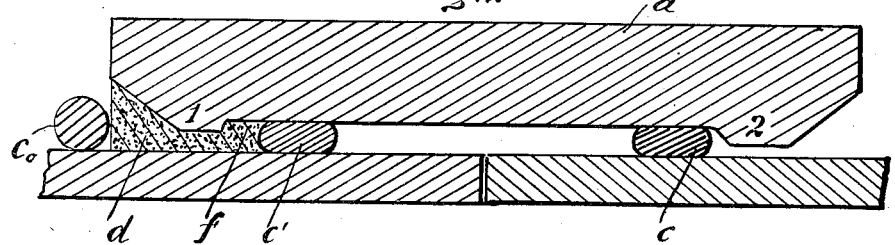
Figs. 2, 3, 4 show three modified forms suitable for relatively high pressures, in which forms there are irregularities of the inner surface near each end of a cylindrical sleeve.
Figure 3:
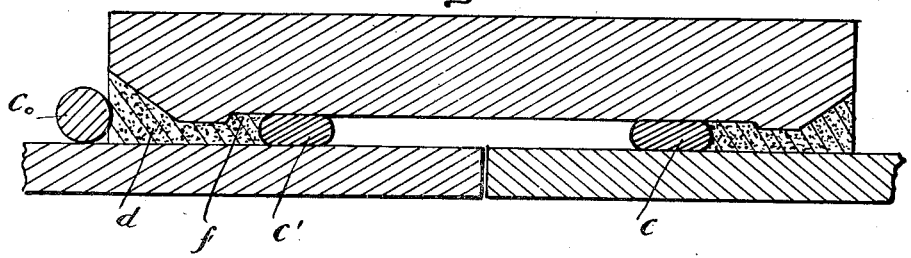

Fig. 2 shows the more usual construction.

1 and 2 are two teeth or projections formed on the inner surface of sleeve or collar $a$; the projection, for instance 1, near one end is greater, that is, ends farther away from the outer surface of the pipe than the other tooth or lip 2 which ends about 2 mm. only away from the pipe, the tooth 1 therefore projecting less than the tooth 2. Recesses are formed between the collar and the pipe-ends which extend to the internal ends of the lips which taper towards the ends of the collar.

In the construction according to Fig. 2 the free space left between the tooth 2 and the pipe is constant in all cases, whereas the free space between the tooth 1 and the pipe varies according to the diameters and the types, because the sections of the rubber packing are varying. Normally the sleeve length should be such that the two rubber packings are not less than three centimeters away from the point where the two pipe lengths meet. The two rubber packings $c^0$ should be of excellent quality and elasticity and should preferably be in the form of rings cast in a single piece in a mould, or in the form of rings made of rubber rope the ends of which are united together in such a manner that the ring shows a uniform section throughout. The internal diameter of these rubber sealing rings should be equal to the internal diameter of the pipe plus a single thickness of the tube wall; or when the wall thickness of the pipes is limited, the internal diameter of the rubber rings should correspond to that of the outer circumference of the pipe less one fourth. The object of this is to secure a certain initial adherence of the rings to the pipe. The pipe ends should be cylindrical and smooth in order to permit the rubber rings to slide upon them and in order to secure tightness.

Figure 4:
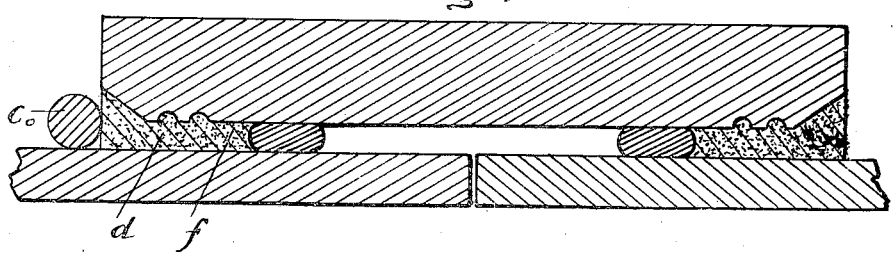

Instead of teeth equally or unequally projecting ridges, formed by grooving the interior of the sleeve at the ends, may be provided, as shown on Fig. 4.

On the end of one of the pipe lengths to be coupled, the sleeve $a$ is provisionally mounted at a distance equal to the length of the sleeve; after this, one of the rubber rings $c$ is threaded on the pipe, in contact with and in front of the sleeve, care being of course taken that the sleeve end concerned, viz. nearest to the tube junction, shall be that whose tooth is less projecting. The opposite pipe length to be coupled is now brought near to the pipe length already mentioned and, before bringing it into contact with the latter, a rubber ring $c'$ is threaded on the second named pipe length in such a manner that this ring lies on the end of the pipe.

The two rubber rings should be arranged on the pipes carefully, all twisting being avoided and attention being paid that they shall be an equal distance away from the pipe edge (all over their circumference). The rubber rings are indicated with $c^0$ on the drawing to indicate the shape of the cross-section of the rings before they are engaged between the sleeve and the pipe.

Now, while keeping the two pipe lengths well aligned, a simple draw-tool is secured to the second named pipe length at a convenient distance, the drawing-tool consisting of tongs and two screw-threaded drawing rods fitted with jaws at their end. The tongs are firmly clamped on the pipe so as to prevent the draw-tool from sliding along the pipe, and the jaws are caused to seize the rear end of the sleeve. The screw-threaded rods are now turned and thereby the sleeve slowly and uniformly drawn towards the junction point of the two pipe lengths. On thus advancing, the bellmouthed end of the sleeve seizes the rubber packing previously threaded upon the first named pipe length.

As the drawing action exerted by the drawing rods continues, the sleeve continues to advance and the said rubber ring rolls on the pipe surface and gets flattened; the distance travelled by the rubber ring, however, is only half the distance travelled by the sleeve.

Attention should be paid that the sleeve shall move coaxially to the pipe and to this effect any irregularity of the advancing of the sleeve should be corrected by slowing down or accelerating the revolution of one drawing rod relatively to the other. As the sleeve proceeds further on, the sleeve will seize also the second rubber ring threaded on the second named pipe length. The advancing movement of the sleeve should be stopped when its forward end projects beyond the pipe end a distance equal to half the length of the sleeve, in other words when the pipe junction comes to lie midway of the sleeve length.

At this moment the tongs are released and removed to another point of the piping, there to carry out another coupling in a similar way.

The coupling being now completed, at the sleeve end where the lower (less projecting) tooth lies, a very thin and very meager cement mortar is poured so that it fills all the space up to the rubber ring. When the mortar has commenced to set, its outer surface should be smoothed with the trowel, and when the mortar setting is completed the piping should be filled with fluid and submitted to a pressure test for which either the normal working pressure or the special pressure fixed for the control trials will be set up by means of a pump.

The cement mortar applied in the manner just explained is anchored in place by the said tooth of the sleeve and prevents the rubber packing from being forced out by the internal pressure or by sudden over-pressures due to hammering. At the sleeve end away from the end that has been filled with cement mortar the rubber packing cannot be forced out, because the sleeve tooth at that end projects far more and consequently the free space between the inner surface of the sleeve and the outer surface of the pipe is so limited that a forcing out of the rubber ring is absolutely excluded.

In the event of piping deflections due to subsiding of the ground, the joint made in the manner above described gives way too due to its resiliency.

In the event of a marked subsiding, the cement mortar filling the bellmouthed end of the sleeve breaks up due to its meager composition and detaches itself; however, the portion $f$ anchored between the sleeve tooth and the rubber ring remains in place and as this mortar portion $f$ is very short, the pipe is allowed to deflect under the action of the subsiding soil. At the opposite end, where no mortar exists and where the sleeve tooth reaches close to the pipe, the deflection of the pipe takes place about the rubber ring as center. In this manner, deflections up to about 6° are allowed under pressure without any prejudice to the tightness of the coupling.

For the same reasons an appreciable deflection can be given to each pipe length from the very laying out of the piping; of course in this case the two pipe lengths should first be laid in straight alignment with each other and, after the coupling has been made, the desired deflection should be imparted to the pipes. In this manner the insertion of bends can in many cases be avoided.

The deflection can be such that with pipes 4 metres long each a closed circle of 38 metres radius can be made, and with pipes 2 metres long each a closed circle with only 19 metres radius can be obtained.

Where no projecting teeth are provided on the sleeve, cement mortar is poured at both ends of the sleeve (Figs. 1 and 4).

Having now particularly described and ascertained the nature of my said invention and in what manner the same is to be performed, I declare that what I claim is:

1. The combination of two pipes arranged end to end, a collar surrounding both pipe ends so as to leave a sealing ring recess between itself and the pipes, sealing rings in said recess, one around each pipe, said sealing rings being in a radially compressed and sealing condition resulting from their being rolled into the collar by a single movement of the collar in one direction relatively to the pipes, and integral means so contracting the mouths of the ring recess as to prevent the rings from being forced out through said mouths.

2. The combination of two pipes arranged end to end, a collar surrounding both pipe ends so as to leave a sealing ring recess between itself and the pipes, sealing rings in said recess, one around each pipe, said sealing rings being in a radially compressed and sealing condition resulting from their being rolled into the collar by a single movement of the collar in one direction relatively to the pipes, and projections extending inwardly adjacent the ends of the collar for contracting the mouths of the ring recess to prevent the rings from being forced out through said mouths.

3. The combination of two pipes arranged end to end, a collar surrounding both pipe ends so as to leave a sealing ring recess between itself and the pipes, sealing rings in said recess, one around each pipe; said sealing rings being in a radially compressed and sealing condition resulting from their being rolled into the collar by a single movement of the collar in one direction relatively to the pipes, projections extending inwardly adjacent the ends of the collar for contracting the mouths of the ring recess to prevent the rings from being forced out through said mouths, and cementitious material at least at one end of said collar beyond the corresponding ring between the pipe end and collar.

4. The combination of two pipes arranged end to end, a collar surrounding both pipe ends so as to leave a sealing ring recess between itself and the pipes, sealing rings in said recess, one around each pipe, said sealing rings being in a radially compressed and sealing condition resulting from their being rolled into the collar by a single movement of the collar in one direction relatively to the pipes, a projection extending inwardly adjacent the advancing end of the collar permitting a rolling passage of the sealing rings therebetween and the pipes, and a projection adjacent the other end of the collar extending inwardly to a greater extent than said first-mentioned projection, said projections contracting the mouths of the ring recess to prevent the rings from being forced out through said mouths.

5. The combination of two pipes arranged end to end, a collar surrounding both pipe ends so as to leave a sealing ring recess between itself and the pipes, sealing rings in said recess, one around each pipe, said sealing rings being in a radially compressed and sealing condition resulting from their being rolled into the collar by a single movement of the collar in one direction relatively to the pipes, a projection extending inwardly adjacent the advancing end of the collar permitting a rolling passage of the sealing rings therebetween and the pipes, a projection adjacent the other end of the collar extending inwardly to a greater extent than said first-mentioned projection, said projections contracting the mouths of the ring recess to prevent the rings from being forced out through said mouths, and cementitious material at the end of the collar beyond the ring at said first-mentioned projection, between the corresponding pipe end and the collar.

ADOLFO MAZZA.